US012637203B2

(12) United States Patent
Lawniczak et al.

(10) Patent No.: US 12,637,203 B2
(45) Date of Patent: May 26, 2026

(54) SYSTEM AND METHOD FOR CONTROLLING ACTUATORS IN AN AIRCRAFT

(71) Applicant: SAFRAN ELECTRONICS & DEFENSE, Paris (FR)

(72) Inventors: Remi-Louis Lawniczak, Moissy-Cramayel (FR); Julien Bonnet, Moissy-Cramayel (FR); Michael Montoya, Moissy-Cramayel (FR); Nicolas Charrier, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 60 days.

(21) Appl. No.: 18/851,930

(22) PCT Filed: Apr. 4, 2023

(86) PCT No.: PCT/EP2023/058754
§ 371 (c)(1),
(2) Date: Sep. 27, 2024

(87) PCT Pub. No.: WO2023/198507
PCT Pub. Date: Oct. 19, 2023

(65) Prior Publication Data
US 2025/0206442 A1      Jun. 26, 2025

(30) Foreign Application Priority Data
Apr. 15, 2022      (FR) ........................................ 2203500

(51) Int. Cl.
*B64C 13/30*           (2006.01)
*B64F 5/60*            (2017.01)

(52) U.S. Cl.
CPC ................ *B64C 13/30* (2013.01); *B64F 5/60* (2017.01)

(58) Field of Classification Search
CPC .......... B64C 13/30; B64C 13/503; B64F 5/60
See application file for complete search history.

(56) References Cited

U.S. PATENT DOCUMENTS

| | | | | | |
|---|---|---|---|---|---|
| 4,825,748 | A | * | 5/1989 | Sheng | F15B 11/22 91/530 |
| 2007/0164166 | A1 | * | 7/2007 | Hirvonen | B64C 13/504 244/175 |
| 2017/0069145 | A1 | * | 3/2017 | Dorkel | G07C 5/006 |

FOREIGN PATENT DOCUMENTS

| | | |
|---|---|---|
| FR | 2927308 A1 | 8/2009 |
| FR | 2981044 A1 | 4/2013 |

(Continued)

OTHER PUBLICATIONS

English Translation of the Written Opinion of the International Searching Authority for PCT/EP2023/058754; date of mailing Jun. 23, 2023; retrieved from https://patentscope.wipo.int/search/en/detail.jsf?docId=WO2023198507 (Year: 2023).*

(Continued)

*Primary Examiner* — Helal A Algahaim
*Assistant Examiner* — Calvin Cheung
(74) *Attorney, Agent, or Firm* — Rankin, Hill & Clark LLP

(57) ABSTRACT

A system for controlling actuators in an aircraft. The system including at least a first actuator and a second actuator. Each of the actuators including a movement member, at least one measurement sensor, and a computing member internally connected to the movement member and configured to be connected to at least one electronic computer of the aircraft. The computing member having a function for controlling the movement member, the measurement sensor of the first (Continued)

actuator being externally connected to the computing member of the second actuator, the computing member of the second actuator also having a monitoring function for monitoring the movement member of the first actuator.

11 Claims, 5 Drawing Sheets

(56)                    References Cited

FOREIGN PATENT DOCUMENTS

WO          2007018652  A1      2/2007
WO          2014199070  A2    12/2014

OTHER PUBLICATIONS

French Search Report for FR2203500, dated Sep. 16, 2022, 2 pages.
International Search Report for PCT/EP2023/058754, dated Jun. 13, 2023, 2 pages.

\* cited by examiner

SYSTEM AND METHOD FOR CONTROLLING ACTUATORS IN AN AIRCRAFT

TECHNICAL FIELD

This invention relates to the field of actuator control in an aircraft.

An aircraft is known to comprise an assembly of actuators, in particular for controlling the flight and movement of the movable surfaces of the aircraft, such as the control surface or the orientation of the blades of a helicopter. The aircraft also comprises electronic computers allowing to control the actuators.

FIG. 1 illustrates an example of an electronic computer 100 with an analogue interface connected to an actuator 200. The actuator 200 comprises a cylinder 300, of the electric or hydraulic type for example, and one or more sensors 400 for measuring the cylinder 300, such as position, force, current and/or temperature sensors.

In a known way, the computer 100 comprises a control function COM and a monitoring function MON, these functions being used to control the actuator 200. The control function COM uses a digital command O, for example "flap open", to generate an analogue setpoint C, usually in the form of a voltage, which is transmitted to the cylinder 300. The monitoring function MON uses an analogue measurement S transmitted by the sensor 400 to calculate a digital state E of the cylinder 300, for example "flap open".

In practice, the control COM and monitoring MON functions are performed independently. In particular, they are implemented in areas of the computer 100 that are physically separate from each other and based on different software. The control and monitoring data is also transmitted between the computer 100 and the actuator 200 via different lines 700, 800. This means that the principles of segregation and dissimilarity may be respected to guarantee a high level of on-board safety, particularly in the event of failure and/or faults.

In a known way, as illustrated in [FIG. 2], it has been proposed in the context of computers 100 with a digital interface that the control COM and monitoring MON functions be transferred internally to the actuator 210. In this way, the actuator 210 directly receives a digital "flap open" command O from the computer 100 and directly supplies it with a digital "flap open" state E.

The principles of segregation and dissimilarity require the integration in the actuator 200 of two computing members 500, 600 which are physically distant, one hosting the control function COM and the other the monitoring function MON. The computing members 500, 600 are also preferably of different types.

This solution has the disadvantage of greatly increasing the mass and overall dimension of the actuators 200, as well as their complexity and their energy consumption.

The patent application WO2007018652A1 in particular describes a real-time computer control system with recovery functions, wherein the actuators are each connected to an associated control and monitoring unit via two computation paths.

The invention thus aims to eliminate at least some of these disadvantages while respecting the imperatives of segregation and dissimilarity.

SUMMARY

The invention relates to an actuator control system in an aircraft, said control system comprising at least a first actuator and a second actuator physically distant from each other, each actuator comprising:

- a movement member,
- at least one sensor for measuring at least one physical parameter of the movement member in the form of an analogue measurement, and
- a computing member internally connected to the movement member and configured to be connected to at least one electronic computer of the aircraft,
- said computing member comprising a function for controlling the movement member, configured to transmit an analogue setpoint to the movement member on the basis of a digital command coming from the electronic computer.

The invention is remarkable in that the measurement sensor of the first actuator is connected externally to the computing member of the second actuator, said computing member of the second actuator also comprising a function for monitoring the movement member of the first actuator, configured to transmit a digital state of the movement member of the first actuator to the electronic computer on the basis of the analogue measurement of the measurement sensor of the first actuator.

The invention advantageously proposes to distribute the control of an actuator in an innovative way so as to be able to integrate a single computing member into the actuator, instead of the two separate computing members physically required in the prior art, and which may be of different natures. By integrating a single computing member, the actuator may be made significantly smaller, more compact and cheaper.

The control system proposed by the invention consists of implementing the control function internally in the actuator and the monitoring function externally, i.e. in another actuator. The computing member of an actuator thus performs two functions: a function of controlling said actuator and a function of monitoring an actuator other than the one to which it belongs. In this way, the control and monitoring functions that are traditionally segregated to comply with aeronautical safety requirements are implemented in the same computing member, which is contrary to practices known to those person skilled in the art. In practice, the control and monitoring functions of two different actuators are cleverly implemented by the same computing member, the control and monitoring functions of the same actuator being implemented in separate computing members belonging to two different actuators. This allows to ensure compliance with the principle of segregation.

According to one aspect of the invention, the computing member of the second actuator is made in one-part. Unlike the prior art, the invention does not require the need to provide two physically segregated computing members in an actuator, so as to reduce the mass, volume and cost of the actuator. To meet the segregation requirement, an actuator is monitored not only by the internal computing member of the actuator, but also by the internal computing member of another separate actuator.

According to one aspect of the invention, the movement member of each actuator is monitored by the computing member of at least one actuator other than that to which it belongs. Thanks to the invention, a single computing member is required in each aircraft actuator instead of two, which allows to reduce the overall mass and volume associated with actuators in the aircraft. The control of the actuators is simplified.

Preferably, the movement member of each actuator is monitored by the computing member of a single actuator other than the one to which it belongs. Each actuator is therefore monitored by a single monitoring path, connected to the computing member external to the aircraft, which guarantees a high level of safety while limiting the number of cables and links.

According to one aspect of the invention, the measurement sensor of the first actuator is also internally connected to the computing member of the first actuator, said computing member of the first actuator also comprising a function for monitoring the movement member of the first actuator, configured to transmit a digital state of the movement member of the first actuator to the computer on the basis of the analogue measurement of the measurement sensor of the first actuator. Advantageously, the first actuator is monitored via two different independent and segregated monitoring paths, which increases the level of safety in the event of a fault and/or failure.

According to one aspect of the invention, the control system comprises at least one pair of two actuators and the movement member of each actuator of the pair is monitored by the computing member of the other actuator of the pair. In this way, the monitoring is carried out symmetrically between two actuators. A possible failure of a computing member is therefore likely to result in the loss of control of one actuator and the loss of monitoring of the other actuator, but not both functions for the same actuator.

According to one aspect of the invention, the control system comprises at least three actuators forming a group ordered consecutively in a circular manner and wherein, in each actuator of the group:

the movement member is monitored by the computing member of the next order actuator in the group, and the computing member comprises a function for monitoring the movement member of the previous-order actuator of the group.

This type of daisy-chain monitoring allows the principle of segregation to be respected while limiting the number of cables and links, for a simplified, cost-effective monitoring.

According to one aspect of the invention, the control system comprises an assembly of at least two actuators wherein the movement member of each actuator in the assembly is monitored by the computing member of each actuator of the assembly. Each actuator in the assembly is therefore monitored via multiple independent and segregated monitoring paths, for an enhanced level of safety. In addition, increasing the number of monitoring paths makes it advantageous to identify more precisely the origin and/or replacement of the fault/failure, which may be in the level of the acquisition electronics, wiring or computing members, among others.

According to one aspect of the invention, the control system also comprises at least one aircraft electronic computer, the computing member of each actuator being connected to the at least one electronic computer so as to transmit the digital command and the digital state of said actuator, preferably via a single digital transmission line. With a single transmission line per actuator, wiring allows to be reduced while maintaining a high level of safety. The segregation principle is respected because each digital transmission line allows the transfer of control data relating to one actuator and monitoring data relating to another actuator. The control and monitoring data for a single actuator are split between two digital transmission lines.

The invention also relates to an aircraft comprising a control system as described above.

The invention also relates to a method for controlling actuators in an aircraft implemented by means of the control system as described above, method wherein:

the computing member of the first actuator implements a step for controlling the movement member of the first actuator, the control step consisting in transmitting an analogue setpoint to said movement member on the basis of a digital command coming from the electronic computer, and the computing member of the second actuator implements a step of monitoring the movement member of the first actuator, the monitoring step consisting in transmitting a digital state of said movement member to the electronic computer on the basis of the analogue measurement of the measurement sensor of the first actuator.

The control is therefore implemented by means of several computing members belonging to different actuators. This segmentation of the control functions, i.e. control and monitoring, allows the principle of segregation to be respected, with a simplified actuator architecture requiring only a single computing member.

Preferably, the computing member of the first actuator also implements a step for monitoring the movement member of the first actuator. This allows to provide two independent monitoring paths for increased safety.

Preferably, the computing member of a third actuator also implements a step for monitoring the movement member of the first actuator. This allows to provide three independent monitoring paths for increased safety and more accurate detection of the location of any faults.

DRAWINGS

The invention will be better understood on reading the following description, given by way of example, with reference to the following figures, given by way of non-limiting examples, wherein identical references are given to similar objects.

It should be noted that the figures set out the invention in detail in order to implement the invention, said figures of course being able to be used to better define the invention if necessary.

DETAILED DESCRIPTION

The invention relates to a system and a method for controlling actuators in an aircraft.

Figure 1:
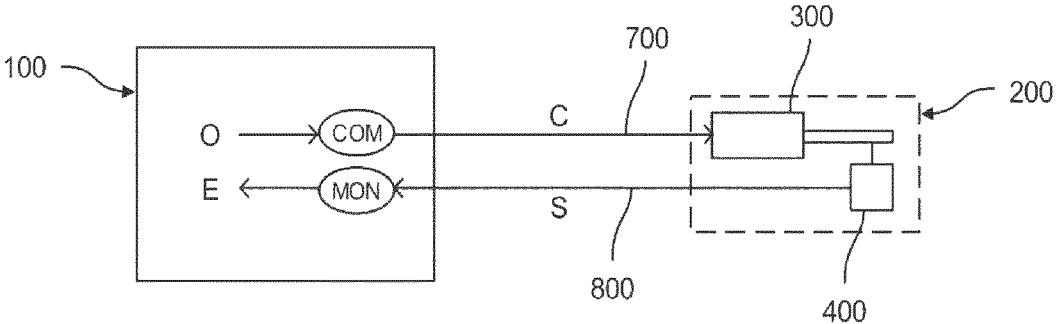
FIG. 1 is a schematic representation of the control of an actuator by means of an analogue interface computer in a prior art aircraft.
Figure 2:
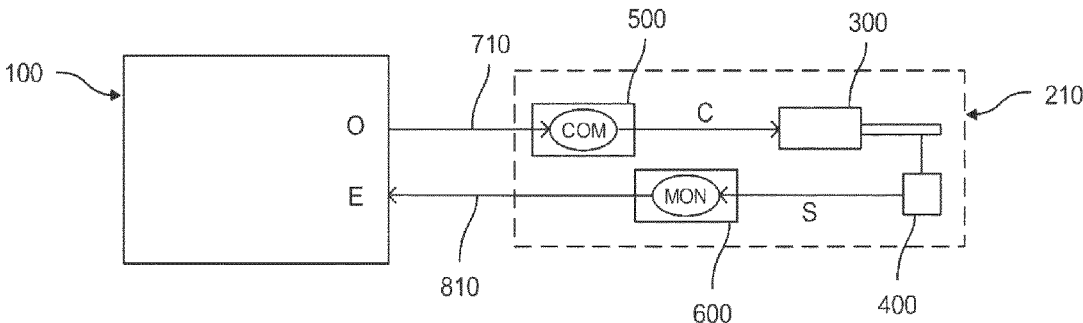
FIG. 2 is a schematic representation of an actuator equipped with internal computing members for its control and connected to a computer with a digital interface in an aircraft according to the prior art.
Figure 3:
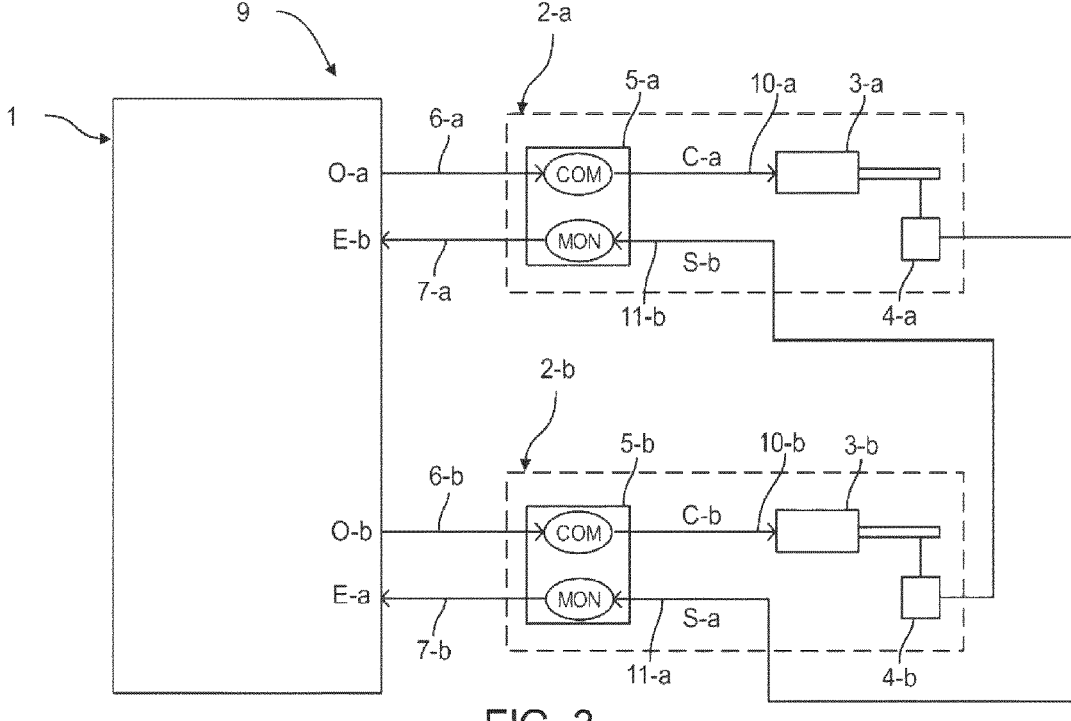
FIG. 3 is a schematic representation of a system for controlling a pair of actuators in an aircraft according to one embodiment of the invention.

With reference to [FIG. 3], an aircraft, for example an aeroplane, a helicopter or an airship, comprises an assembly of actuators 2, in particular dedicated to flight control and the movement of the movable surfaces of the aircraft, such as the control surface or the orientation of the blades of a helicopter. The aircraft also comprises an assembly of electronic computers 1 connected to the actuators 2 to allow them to be controlled. In the example shown in [FIG. 3], a first actuator 2-*a* and a second actuator 2-*b* are shown, each connected to the same electronic computer 1. The number of electronic computers 1 in the context of the invention is arbitrary.

As illustrated in [FIG. 3], each actuator 2 comprises a movement member 3, for example an electric or hydraulic cylinder, and one or more measurement sensors 4 (only one shown in [FIG. 3]), such as position, force, current and/or temperature sensors. The movement member 3 is configured to move in response to an analogue displacement setpoint C, in particular in the form of an electrical voltage. Each measurement sensor 4 is configured to measure a physical parameter, in the form of an analogue measurement S, of the movement member 3 of the actuator 2 wherein it is mounted. Several measurement sensors 4 may be provided to make several measurements of the same parameter of the movement member 3. Several measurement sensors 4 may also be provided to measure different parameters of the movement member 3.

As illustrated in [FIG. 3], each actuator 2 also comprises a computing member 5, which is connected to the movement member 3 of the actuator 2 to which it belongs and to an electronic computer 1. The computing member 5 is therefore an element of the actuator 2, separate from the electronic computer 1. A link internal to the actuator 2 connects the computing member 5 to the movement member 3. A link external to the actuator 2 connects the computing member 5 to the electronic computer 1. The links are preferably wired. The external link is, by way of non-limiting examples, in the form of a point-to-point link or a bus. The computing member 5 is, for example, a processor.

With reference to [FIG. 3], the computing member 5 comprises a control function COM for the movement member 3, namely a computation path, which is configured to transmit an analogue setpoint C to the movement member 3, on the basis of a digital command O from the electronic computer 1. The electronic computer 1 is of the digital interface type. The electronic computer 1 is configured to transmit a digital command O to the computing member 5 via the external link, hereinafter referred to as the "digital control line 6". The digital command O is, for example, in the form of a setpoint for controlling the actuator 2, such as "flap open". The computing member 5 is configured to convert the digital command O into the analogue setpoint C. The analogue setpoint C is transmitted to the movement member 3 via the internal link, referred to hereafter as the "analogue control line 10".

According to the invention and as illustrated in [FIG. 3], the invention relates to a control system 9 comprising a plurality of actuators 2 physically distant from one another, including at least a first actuator 2-*a* and a second actuator 2-*b*, wherein:

the measurement sensor 4-*a* of the first actuator 2-*a* is connected externally to the computing member 5-*b* of the second actuator 2-*b*, and the computing member 5-*b* of the second actuator 2-*b* also comprises a function MON for monitoring the movement member 3-*a* of the first actuator 2-*a*, configured to transmit a digital state E-a of the movement member 3-*a* of the first actuator 2-*a* to the computer 1 on the basis of the analogue measurement S-a of the measurement sensor 4-*a* of the first actuator 2-*a*.

The monitoring function MON is a computation path known as "Monitoring", which allows the control function COM to be monitored to detect any faults. The control COM and monitoring MON functions are different computation paths, i.e. based on different software, to respect the dissimilarity principle. The control COM and monitoring MON functions together allow an actuator 2 to be controlled.

As illustrated in [FIG. 3], the computing member 5-*b* of the second actuator 2-*b* comprises both a control function COM and a monitoring function MON, the first relating to the first actuator 2-*a* while the second relates to the second actuator 2-*b*. For the first actuator 2-*a*, the control function COM and the monitoring function MON are implemented in two different computing members 5-*a*, 5-*b*, namely that of the first actuator 2-*a* for the first and that of the second actuator 2-*b* for the second. The computing members 5-*a*, 5-*b* also belong to actuators 2-*a*, 2-*b* which are physically distant, i.e. not in contact with each other. This advantageously allows to reduce the mass and volume of the actuators 2-*a*, 2-*b*, by limiting the number of computing members 5 required, while preserving the principle of segregation.

In practice, as illustrated in [FIG. 3], an external analogue monitoring line 11-*a* connects the measurement sensor 4-*a* of the first actuator 2-*a* to the computing member 5-*b* of the second actuator 2-*b* to transmit the analogue measurement S-a from the measurement sensor 4-*a* of the first actuator 2-*a*. A digital monitoring line 7-*b* also connects the computing member 5-*b* of the second actuator 2-*b* to the electronic computer 1 to transmit the digital state E-a of the movement member 3-*a* of the first actuator 2-*a*. The digital state E-a transmitted by the second actuator 2-*b* allows the electronic computer 1 to control the execution of the digital command O-a transmitted to the first actuator 2-*a*. The lines are preferably wired. If there are several sensors 4-*a* in the first actuator 2-*a*, each one is connected to the computing member 5-*b* of the second actuator 2-*b*.

The embodiment shown in [FIG. 3] illustrates a control system 9 comprising a first actuator 2-*a* and a second actuator 2-*b* which together form a pair for monitoring purposes. The computing member 5-*a* of the first actuator 2-*a* of the pair monitors the movement member 3-*b* of the second actuator 2-*b* of the pair and vice versa. Each computing member 5-*a*, 5-*b* in the pair thus comprises a control function COM for the actuator 2-*a*, 2-*b* in the pair to which it belongs and a monitoring function MON for the other actuator 2-*a*, 2-*b* in the pair. The operation of the first actuator 2-*a* is symmetrical to that of the second actuator 2-*b*.

As shown in [FIG. 3], the measurement sensor 4-*a*, 4-*b* of each actuator 2-*a*, 2-*b* of the pair transmits an analogue measurement S-a, S-b respectively to the computing member 5-*b*, 5-*a* of the other actuator 2-*b*, 2-*a* of the pair via an external analogue monitoring line 11-*a*, 11-*b*. The computing member 5-*a*, 5-*b* of each actuator 2-*a*, 2-*b* of the pair transmits to the electronic computer 1 a digital state E-b, E-a of the movement member 3-*b*, 3-*a* of the other actuator 2-*b*, 2-*a* of the pair. A control system 9 of this type means that only one computing member 5-*a*, 5-*b* may be provided for each actuator 2-*a*, 2-*b*. The control function COM and the monitoring function MON performed in the same actuator 5-*a*, 5-*b* advantageously do not need to be segregated.

Figure 8:
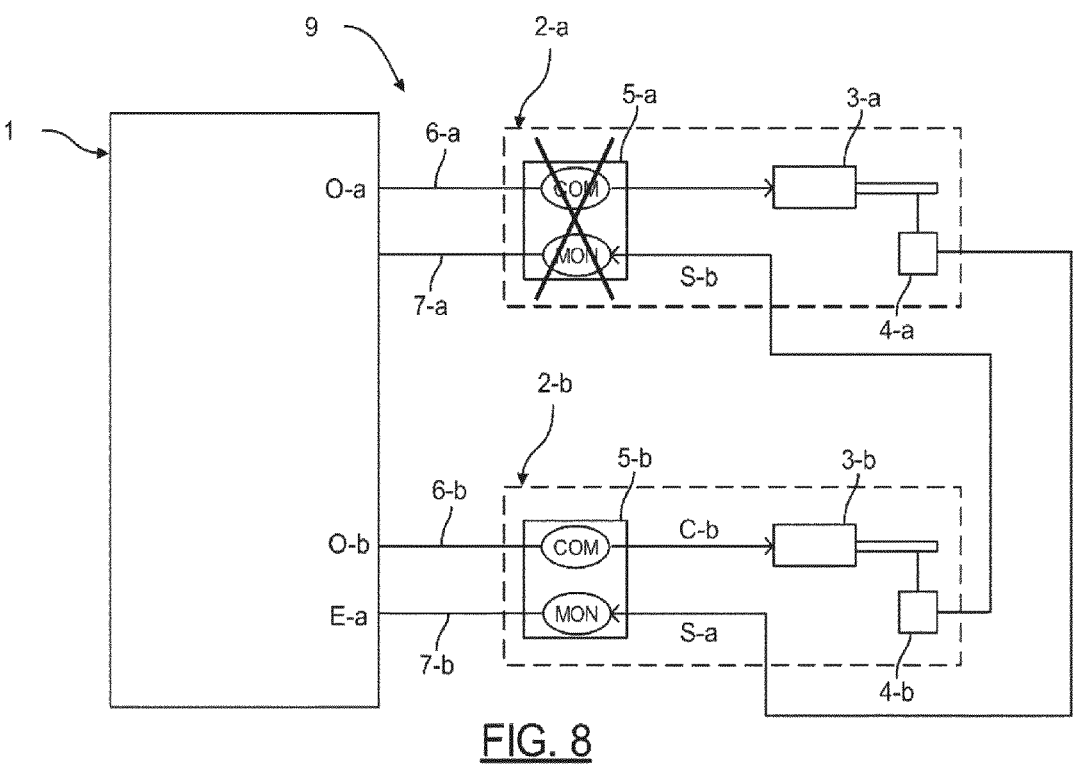
FIG. 8 is a schematic representation of the control system shown in [FIG. 3] in the event of failure of a computing member for an actuator.

FIG. 8 illustrates the control system 9 of [FIG. 3] in the presence of a fault in the computing member 5-*a* of the first actuator 2-*a*. The result is that an analogue setpoint C-a is not transmitted or is transmitted incorrectly to the movement member 3-*a*. In addition, a digital state E-b of the movement member 3-*b* of the second actuator 2-*b* is not transmitted or is transmitted incorrectly to the electronic computer 1. Thus, such a failure affects the control of the first actuator 2-*a* and the monitoring of the second actuator 2-*b*. The control of the second actuator 2-*b* and the monitoring of the first actuator 2-*a* are advantageously preserved, which allows to maintain a partial control of each actuator 2-*a*, 2-*b*.

Figure 4:
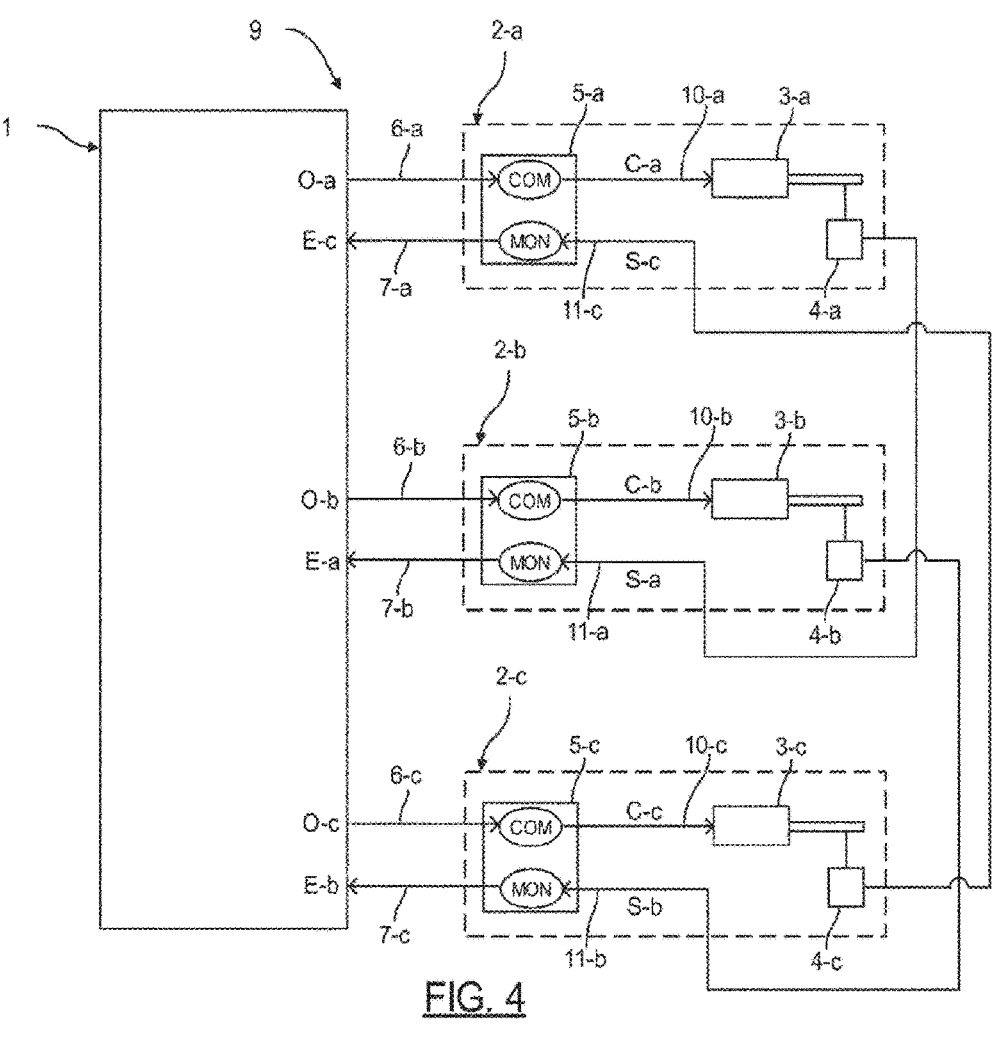
FIG. 4 is a schematic representation of a system for controlling an ordered group of actuators in a circular manner in an aircraft according to another embodiment of the invention.

The embodiment shown in [FIG. 4] illustrates a control system 9 comprising a group of actuators 2-*a*, 2-*a*, 2-*c* which are ordered consecutively in a circular manner to allow a serial monitoring. In each actuator 2-*a*, 2-*b*, 2-*c* of the group, the movement member 3-*a*, 3-*b*, 3-*c* is monitored by the computing member 5-*a*, 5-*b*, 5-*c* of the next order actuator 2-*a*, 2-*b*, 2-*c* of the group. Also in each actuator 2-*a*, 2-*b*, 2-*c* of the group, the computing member 3-*a*, 3-*b*, 3-*c* comprises a function for monitoring MON the movement member 3-*a*, 3-*b*, 3-*c* of the previous-order actuator 2-*a*, 2-*b*, 2-*c* of the group.

In the example in [FIG. 4], the group is formed by three actuators 2-*a*, 2-*b*, 2-*c* ordered as follows: a first actuator 2-*a*, a second actuator 2-*b* and then a third actuator 2-*c*. For example, for the second actuator 2-*b*, the next-order actuator is the third actuator 2-*c* and the previous-order actuator is the first actuator 2-*a*. The order is circular, i.e. the first-order actuator is consecutive to the last-order actuator. By way of example, for the third actuator 2-*c*, the next order actuator is the first actuator 2-*a*.

In the example shown in [FIG. 4], an external analogue monitoring line 11-*a*, 11-*b*, 11-*c* connects each measurement sensor 4-*a*, 4-*b*, 4-*c* to the computing member 5-*a*, 5-*b*, 5-*c* of the next-order actuator 2-*a*, 2-*b*, 2-*c*. In this way, the first actuator 2-*a* monitors the third actuator 2-*c* and is monitored by the second actuator 2-*b*, which in turn is monitored by the third actuator 2-*c*. This allows to form a serial monitoring chain wherein each computing member 5-*a*, 5-*b*, 5-*c* comprises both a control function COM and a monitoring function MON, the monitoring function MON relating to an actuator 2-*a*, 2-*b*, 2-*c* other than that to which it belongs.

The preceding description also applies to an ordered group comprising more actuators 2. The maximum number of actuators 2 in the ordered group is not limited. The minimum number of actuators 2 in the ordered group is two and corresponds to the embodiment shown in [FIG. 3]. Operating as an ordered group also offers the same advantages as operating as a pair in the event of a fault, such as that illustrated in [FIG. 8].

The embodiments illustrated in FIGS. 3 and 4 may be combined, i.e. the control system 9 may comprise one or more different pairs of actuators 2 and/or one or more different ordered groups of actuators 2, each comprising any plural number of actuators 2.

Figure 5:
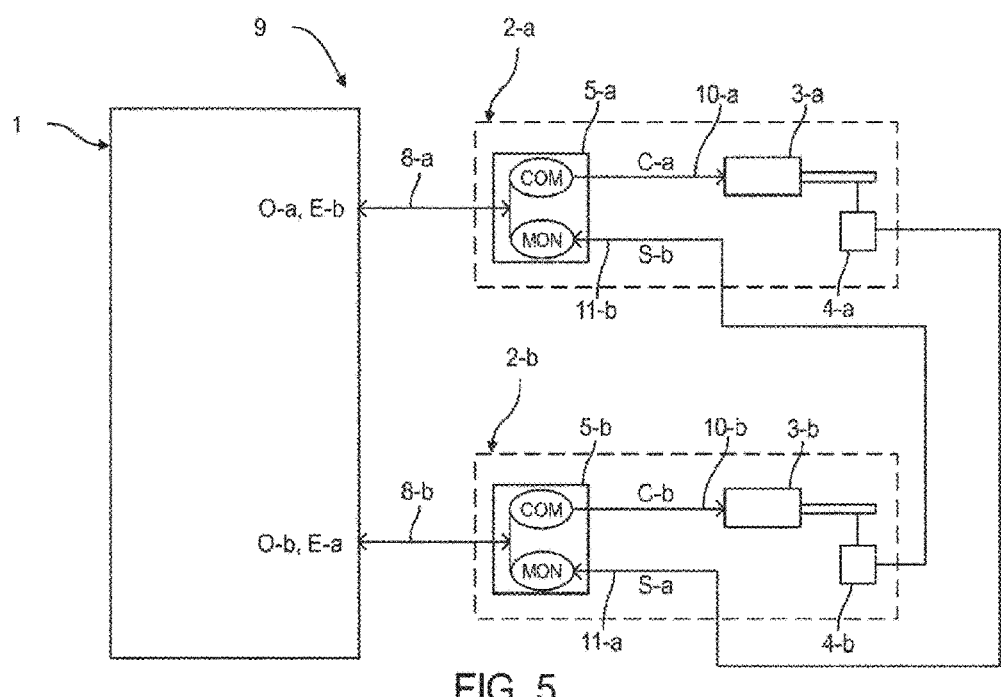
FIG. 5 is a schematic representation of a control system with a digital control and monitoring line towards the computer according to another embodiment of the invention.

The embodiment shown in [FIG. 5] differs from that shown in [FIG. 3] in that the digital control line 6 and the digital monitoring line 7 connecting the computing member 5 of an actuator 2 to the electronic computer 1 are merged to form a digital control and monitoring line 8. The digital command O from the electronic computer 1 and the digital state E from the computing member 5 of the actuator 2 are both transmitted via the digital control and monitoring line 8.

This allows to reduce the number of digital lines, in practice by up to half, while preserving the principle of segregation. The digital command O and the digital state E transmitted on the same digital line 8 relate to the movement members 3 of two different actuators 2. For example, the digital control and monitoring line 8-*a* connected to the first actuator 2-*a* is used to transmit the digital command O-a relating to the movement member 3-*a* of the first actuator 2-*a* and the digital state E-a relating to the movement member 3-*b* of the second actuator 2-*b*.

Figure 9:
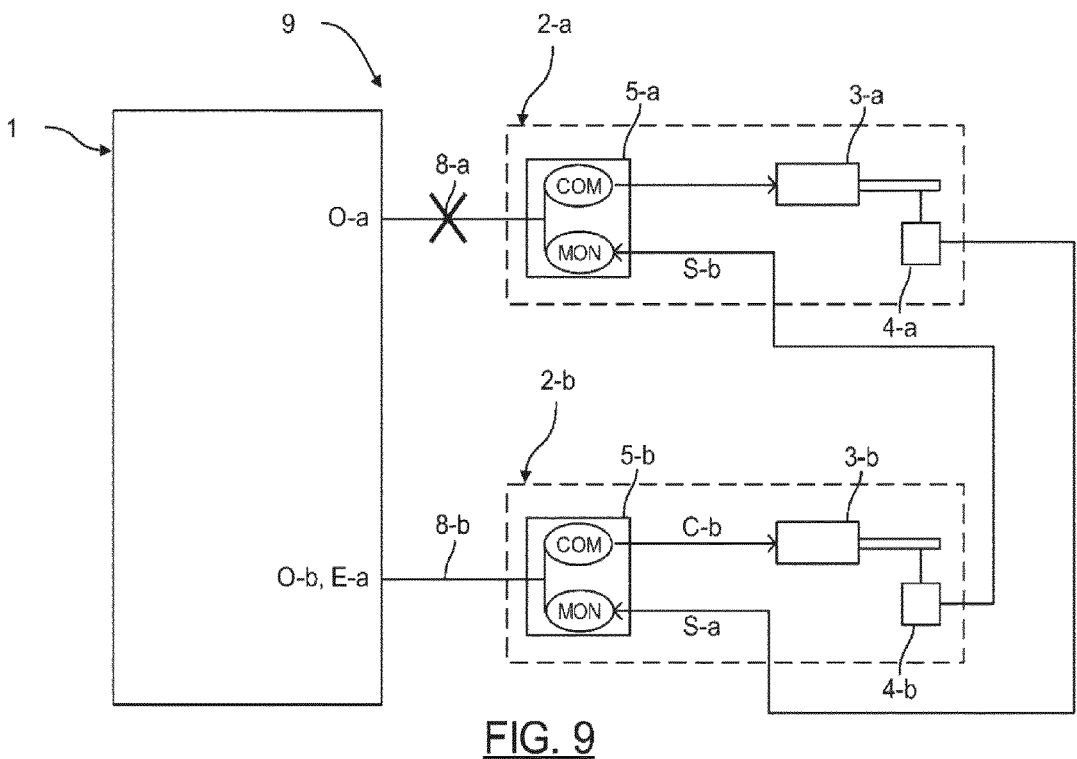
FIG. 9 is a schematic representation of the control system in [FIG. 5] in the event of failure of the digital control and monitoring line towards the computer.

FIG. 9 illustrates the control system 9 of [FIG. 5] in the presence of a fault in the level of the digital control and monitoring line 8-*a* connected to the first actuator 2-*a*. As a result, a digital command O-a relating to the first actuator 2-*a* is not transmitted or is transmitted incorrectly to the computing member 5-*a*. In addition, a digital state E-b of the movement member 3-*b* of the second actuator 2-*b* is not transmitted or is transmitted incorrectly to the electronic computer 1. Thus, such a failure affects the control of the first actuator 2-*a* and the monitoring of the second actuator 2-*b*. The control of the second actuator 2-*b* and the monitoring of the first actuator 2- are advantageously preserved, which allows to maintain a partial control of each actuator 2-*a*, 2-*b*.

It goes without saying that a digital control line 8-*a*, 8-*b* may be provided for all or some of the actuators 2-*a*, 2-*b* of each pair and/or ordered group of the control system 9.

Figure 6:
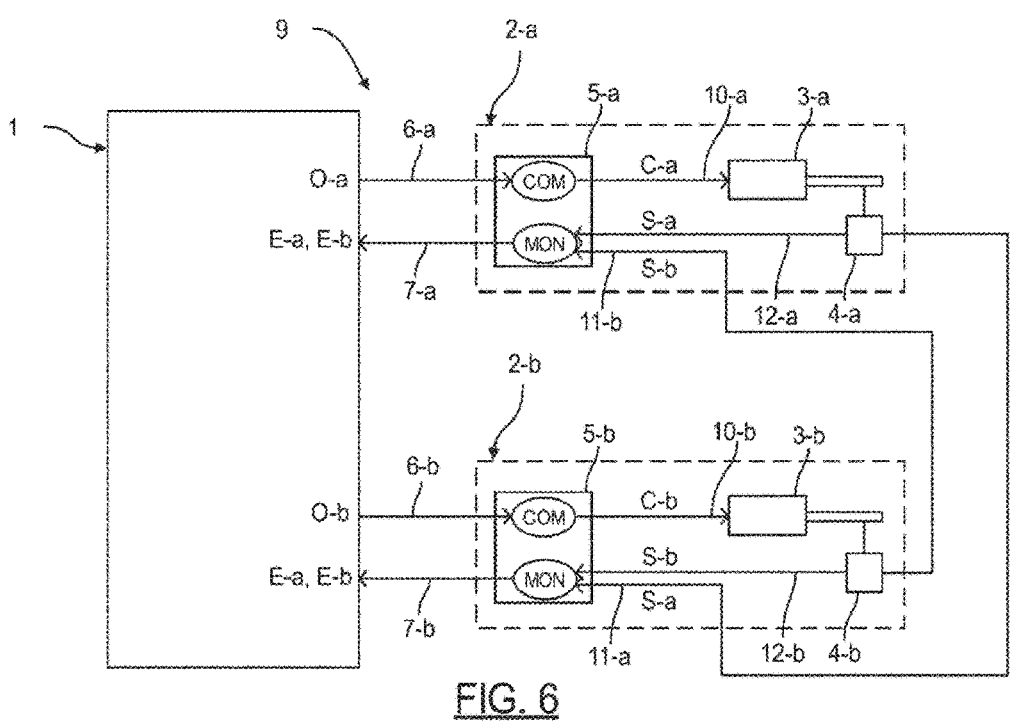
FIG. 6 is a schematic representation of a control system with two monitoring paths according to another embodiment of the invention.

The embodiment shown in [FIG. 6] differs from that shown in [FIG. 3] in that it comprises a dual monitoring path for the first actuator 2-*a* and for the second actuator 2-*b*. As shown in [FIG. 6], the measurement sensor 4-*a*, 4-*b* of each actuator 2-*a*, 2-*b* is also connected via an internal analogue monitoring line 12-*a*, 12-*b* to the computing member 5-*a*, 5-*b* of the actuator 2-*a*, 2-*b* to which it belongs. The computing member 5-*a*, 5-*b* of each actuator 2-*a*, 2-*b* comprises two different monitoring functions MON, namely a first relating to the first actuator 2-*a* and a second relating to the second actuator 2-*b*. In other words, the monitoring function MON relating to the first actuator 2-*a* is implemented both in the computing member 5-*a*, 5-*b* of the first actuator 2-*a* and of the second actuator 2-*b*. The same applies to the monitoring function MON for the first actuator 2-*a*.

A dual monitoring path has the advantage of increasing data redundancy, thereby limiting the risk of loss of control in the event of a fault. Another advantage is that it makes it easier to detect the location of the fault. In the example in [FIG. 6], a dual monitoring path has been provided symmetrically for the two actuators 2-*a*, 2-*b* in the pair. However, it goes without saying that a dual monitoring path could be provided for only some of the actuators 2-*a*, 2-*b*. In addition, a dual monitoring path could also be provided for an ordered group of actuators 2.

Figure 7:
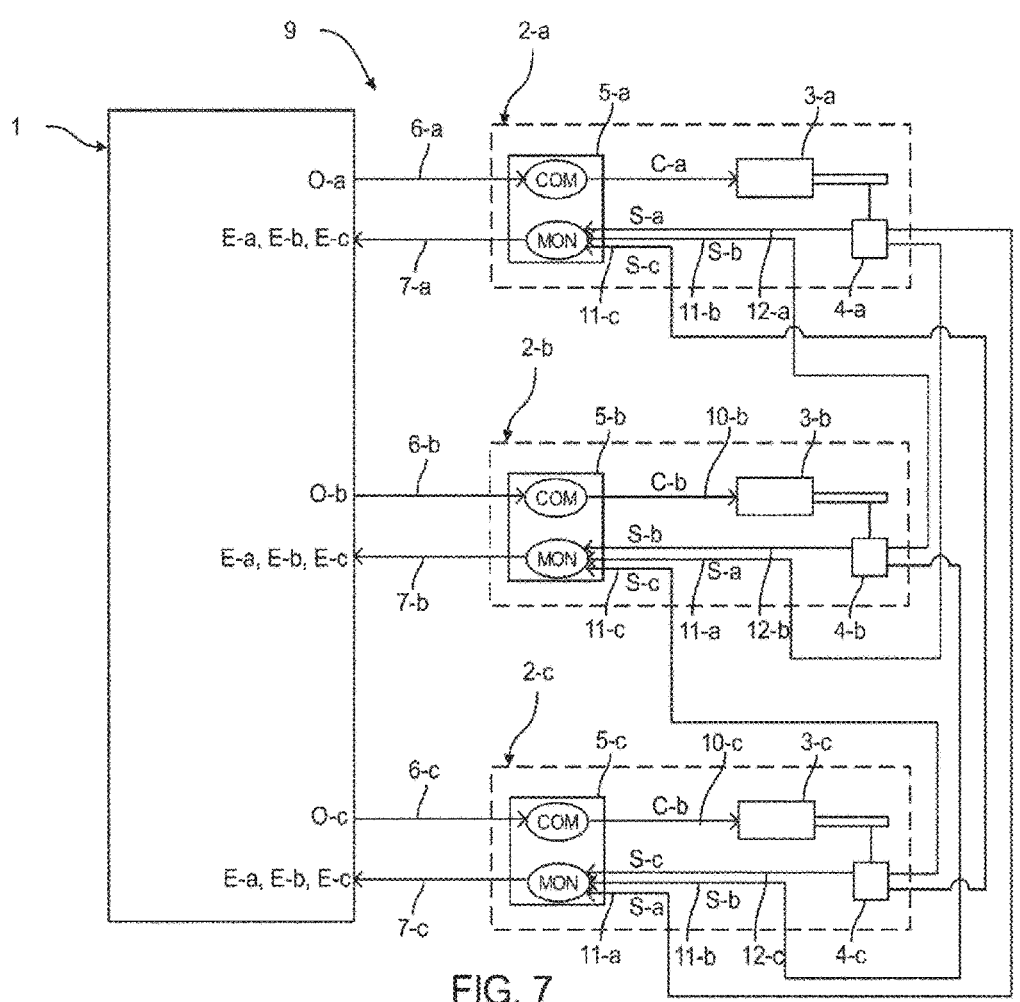
FIG. 7 is a schematic representation of a control system with three monitoring paths according to another embodiment of the invention.

The embodiment shown in [FIG. 7] differs from that shown in [FIG. 4] in that it comprises a triple monitoring path for each actuator 2-*a*, 2-*b*, 2-*c* of the ordered group. As shown in [FIG. 7], the measurement sensor 4-*a*, 4-*b*, 4-*c* of each actuator 2-*a*, 2-*b*, 2-*c* is connected via an internal/ external analogue monitoring line 11-*a*, 11-*b*, 11-*c*, 12-*a*, 12-*b*, 12-*c* to the computing member 5-*a*, 5-*b*, 5-*c* of each actuator 2-*a*, 2-*b*, 2-*c*. Each computing member 5-*a*, 5-*b*, 5-*c* therefore comprises three different monitoring functions MON, one for each actuator 2-*a*, 2-*b*, 2-*c*.

The maximum number of monitoring paths is determined by the number of actuators 2 in the ordered group, i.e. three in this example. In a pair, the maximum number of monitoring paths is two and corresponds to the example shown in [FIG. 6]. A control system 9 equipped with multiple monitoring paths has the advantage of increasing data redundancy and thus limiting the risk of loss of control in the event of a fault. Another advantage is that it allows the location of the fault to be detected. It is therefore possible to adapt the control of the actuators 2-*a*, 2-*b*, 2-*c* accordingly.

Figure 10:
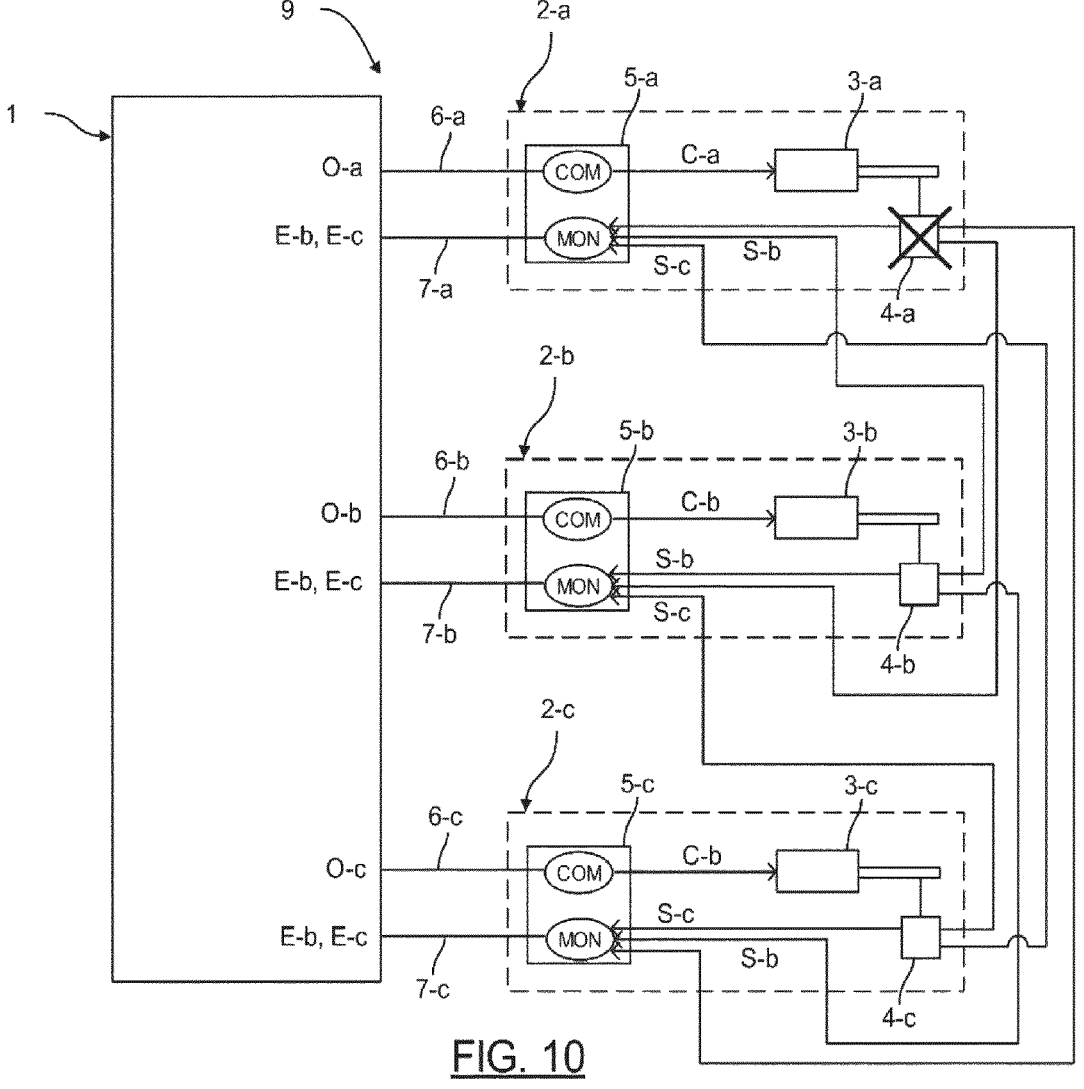
FIG. 10 is a schematic representation of the control system shown in [FIG. 7] in the event of failure of a measurement sensor for an actuator.

FIG. 10 illustrates an example of a failure that may be easily identified thanks to multiple monitoring paths. In this example, the electronic computer 1 does not receive the digital state E-a relating to the first actuator 2-*a* from any computing member 5-*a*, 5-*b*, 5-*c*. The location of the fault may not be a computing member 5-*a*, 5-*c*, 5-*c* because each transmits the digital state E-b, E-c relative to the second and third actuators 2-*b*, 2-*c*. This means that the fault originates from the measurement sensor 4-*a* of the first actuator 2-*a*. The computing members 5-*a*, 5-*b*, 5-*c* may therefore continue to be used safely for controlling.

The invention also relates to an actuator control method comprising a control step and a step for monitoring the movement member 3-*a* of a first actuator 2-*a* of an aircraft control system 9 as described above. As illustrated in FIGS. 3 to 7, during the control step, the computing member 5-*a* of the first actuator 2-*a* transmits an analogue setpoint C-a to the movement member 3-*a* on the basis of a digital command O-a from the electronic computer 1.

As illustrated in FIGS. 3 to 7, during the monitoring step, the computing member 5-*b* of a second actuator 2-*b*, physically distant from the first actuator 2-*a*, transmits to the computer 1 a digital state E-a of the movement member 3-*a* from the analogue measurement S-a of the measurement sensor 4-*a* of the first actuator 2-*a*. In other words, the monitoring step is carried out by an actuator 2-*b* other than the one to which the monitored movement member 3-*a* belongs.

According to a preferred aspect illustrated in FIGS. 6 and 7, the monitoring step is also, redundantly, implemented by the computing member 5-*a* to which the movement member 3-*a* belongs. Preferably and as illustrated in [FIG. 7], the monitoring step is also, redundantly, implemented by the computing member 5-*a*, 5-*b*, 5-*c* of each actuator 2-*a*, 2-*b*, 2-*c* of an ordered group. This allows to have a dual monitoring, increasing data redundancy and making it easier to detect any faults.

The invention claimed is:

1. An actuator control system in an aircraft, said actuator control system comprising at least a first actuator and a second actuator physically distant from each other, each of the first actuator and the second actuator comprising:
   a movement member,
   at least one measurement sensor for measuring an analogue measurement of at least one physical parameter of the movement member, and
   a computing member internally connected to the movement member and configured to be connected to at least one electronic computer of the aircraft,
   said computing member comprising a function for controlling the movement member, configured to transmit an analogue setpoint to the movement member on a basis of a digital command coming from the electronic computer,
   wherein the measurement sensor of the first actuator is connected externally to the computing member of the second actuator,
   said computing member of the second actuator also comprising a monitoring function for monitoring the movement member of the first actuator, configured to transmit a digital state of the movement member of the first actuator to the electronic computer on a basis of the analogue measurement of the measurement sensor of the first actuator.

2. The actuator control system as claimed in claim 1, wherein the computing member of the second actuator is made in one-part.

3. The actuator control system according to claim 1, wherein the movement member of each of the first actuator and the second actuator is monitored by the computing member of at least one of the first actuator and the second actuator other than that to which it belongs.

4. The actuator control system according to claim 1, wherein:
   the measurement sensor of the first actuator is also internally connected to the computing member of the first actuator actuator,
   said computing member of the first actuator also comprises a monitoring function for monitoring the movement member of the first actuator, configured to transmit a digital state of the movement member of the first actuator to the computer on the basis of the analogue measurement of the measurement sensor of the first actuator.

5. The actuator control system according to claim 1, further comprising at least one pair of the first and second actuators, wherein the movement member of each of the first actuator and the second actuator of the pair is monitored by the computing member of the other actuator of the pair.

6. The actuator control system according to claim 1, further comprising a third actuator that cooperates with the first actuator and the second actuator to define a group that is ordered consecutively in a circular manner and wherein, in each of the actuators of the group:
   the movement member is monitored by the computing member of the next order actuator of the group, and
   the computing member comprises a function for monitoring the movement member of the previous-order actuator of the group.

7. The actuator control system according to claim 1, wherein at least the first actuator and the second actuator define an assembly, wherein the movement member of each of the actuators of the assembly is monitored by the computing member of each of the actuators of the assembly.

8. The actuator control system according to claim 1, further comprising at least one aircraft electronic computer, wherein the computing member of each of the first actuator and the second actuator is connected to the at least one aircraft electronic computer so as to transmit the digital command and the digital state, of said first actuator and said second actuator.

9. The aircraft comprising the actuator control system according to claim 1.

10. A method for controlling the first and second actuators in the aircraft with the actuator control system according to claim 1, wherein:
   the computing member of the first actuator implements a step for controlling the movement member of the first actuator, the control step comprising transmitting the analogue setpoint to said movement member on the basis of the digital command coming from the electronic computer, and the computing member of the second actuator implements a step of monitoring the movement member of the first actuator, the monitoring step comprising transmitting the digital state of said movement member to the electronic computer on the basis of the analogue measurement of the measurement sensor of the first.

11. The actuator control system according to claim 1, further comprising at least one aircraft electronic computer, wherein the computing member of each of the first actuator and the second actuator is connected to the at least one aircraft electronic computer so as to transmit the digital command and the digital state, of said first actuator and said second actuator via a single digital control and monitoring line.

\* \* \* \* \*